United States Patent [19]
Andriola et al.

[11] 3,855,681
[45] Dec. 24, 1974

[54] DRIVE FOR SHELL-TYPE ROLLS

[75] Inventors: Achilles D. Andriola; Howard E. Kuehn; Warren C. Whittum, all of Orange, Conn.; Donald E. Wink, Penfield, N.Y.

[73] Assignee: USM Corporation, Boston, Mass.

[22] Filed: Feb. 18, 1972

[21] Appl. No.: 227,373

[52] U.S. Cl. ................................................. 29/115
[51] Int. Cl. ............................................ B60b 15/16
[58] Field of Search.... 29/110, 115, 116 R, 116 AD

[56] References Cited
UNITED STATES PATENTS

| | | | |
|---|---|---|---|
| 2,676,387 | 4/1954 | McArn | 29/116 AD X |
| 3,290,897 | 12/1966 | Kuehn | 29/115 X |
| 3,407,679 | 10/1968 | Berzins | 29/115 X |
| 3,419,890 | 12/1968 | Justus | 29/115 |
| 3,562,882 | 2/1971 | Widmer et al. | 29/116 R |
| 3,639,956 | 2/1972 | Justus | 29/116 AD |

Primary Examiner—Alfred R. Guest
Attorney, Agent, or Firm—Vincent A. White; Richard B. Megley

[57] ABSTRACT

A combination of a drive assembly for a shell-type calender roll and a shell roll including geared coupling means journaled independently of the roll's nonrotatable deflectable stationary shaft and its pedestal support, the geared coupling means having a dual-pinioned countershaft and an associated ring gear, the countershaft being journaled in said pedestal support and having a first pinion driven by a gear connected to driving means for supplying rotary motion thereto and a second pinion driving the ring gear which operably engages the shell roll means to transmit said rotary motion, thereby permitting the stationary shaft to be supported by means independently of the coupling means and transmitting rotary motion to the shell roll journaled on said stationary shaft.

8 Claims, 6 Drawing Figures

DRIVE FOR SHELL-TYPE ROLLS

BACKGROUND OF THE INVENTION

The present invention relates to an improvement in a drive assembly for rolls such as shell-type calendar rolls. Calendar rolls of this type generally include an inner deflectable, nonrotatable shaft (hereinafter denoted as "stationary shaft") and an outer shell, rotatably journaled thereupon. This inner stationary shaft is supported at its ends in bushings mounted on pedestals allowing for central deflection of the shaft, e.g., as a simple beam. In conventional shell-type calender roll drive assemblies, one of which is illustrated in U.S. Pat. No. 3,290,897 to Kuehn, one end of the stationary shaft is supported through the drive assembly which, in turn, is journaled in a complex bearing structure to accommodate for the deflection of the shaft under load. There has been a continuing attempt in the industry to provide adequate support for the nonrotatable stationary shaft while also insuring an adequate driving connection between the rotatable shell roll and the driving means which provides the rotary motion. It should be recognized by those familiar with the art that, during loading of the roll system and maintaining a uniform nip pressure along the length of the shell roll against a cooperating roll, significant deflection occurs along the stationary shaft. This results in substantial misalignment of its axis with the shell roll axis. This misalignment during loading further complicates the power transmission problem. The conventional solution to this problem includes the stationary shaft supported by the pedestal means through the bearing which makes up the driving coupling.

Superimposed on the misalignment problem are the requirements of conservation of space of the installation, large rotary power transmission demands, and minimization of down time through reliability and ease of maintenance. Conventional gear train systems have not met the above criteria in previous efforts to design a better rotary power transmission assembly for a shell roll.

One solution of this complication of transmitting rotary motion to the shell roll under load is the elaborate and expensive roller bearing assembly illustrated in the Kuehn patent. While Kuehn improves on the prior art by teaching improved coupling means disposed between the shell roll and the drive means to accommodate for the deflection of the stationary shaft, the entire load imposed on the end of the shaft must still be transmitted to the base through the roller bearing assembly comprising the driving coupling.

As an alternative solution to transmission of rotary motion to the shell roll, one type of countershaft and pinion arrangement has been employed; however, the drive member of these pinions is journaled on the stationary shaft. Such an arrangement allows no flexibility between the drive member and the shell roll for deflection, placing the misalignment problem between the rotary power sources and the drive member. This solution to driving the shell roll merely creates an alternative problem (flexible drive between rotary power source and drive member) to be solved.

The illustrated embodiments of the present invention provide a new and improved apparatus for supporting a shell-type calender roll and for coupling means which transmits rotary motion from the driving means to the shell roll. The improvements of the present invention are accomplished by means for supporting the deflecting, stationary shaft in self-aligning support bushings mounted directly on pedestal means. These support bushings may be similar to the support means of the non-drive end of the shaft. The shell roll may then be connected to the driving means through coupling means including means designated as a countershaft having a pinion-couple thereon which is journaled in the pedestal support means and independently of the support for the deflecting stationary shaft. For definition purposes, the pinion-couple is to be understood to include dual pinions disposed on the countershaft for concurrent rotation therewith and capable of transmitting rotary motion from the driving means through an intermediate ring gear to the shell roll. By such means the invention provides for improved support of the stationary shaft in that it may be supported directly, as on the pedestal means, and not through the complex combination of rolling friction bearings which make up a conventional driving coupling. Further, the driving means may now be coupled to the shell roll through a gear train incorporating the coupling means which may accomplish the necessary gear/speed reduction which was previously required to be externally provided.

A further advantage may be gained in certain of the particular embodiments of the invention by locating the gear coupling from the drive means to the shell roll such that it is misaligned when the mill is unloaded, but substantially aligned when the mill is under load. Since a predominant amount of the coupling strain and wear occurs when the mill is loaded, the coupling may be intentionally misaligned by an amount equal to the anticipated load deflection. The coupling means will then approach an aligned condition when the mill is loaded, which will result in material extension of coupling and seal life and efficiency.

SUMMARY OF THE INVENTION

The overall objects of the invention include the elimination of complicated and expensive roller bearing assemblies in conventional drive couplings for such as shell-type rolls, and provision of a solid structural support for the deflecting shaft.

To these ends and in accordance with certain features of the invention a shell-type roll including a nonrotatable stationary shaft is supported by pedestal means. The shell roll is disposed over the stationary shaft intermediate its ends and is supported thereon by bearing means. An annular flange having gear teeth is fixedly secured to the shell roll at one end, opposite independent drive means (which may be an electric motor with a driving gear proximate the end of the shell roll). Means coupling the drive means to the annular flange includes a countershaft having a pinion-couple thereon and an associated intermediate ring gear. The countershaft is journaled independently of the stationary shaft, as within the pedestal support. One end of the pinion-couple on the countershaft engages the driving means and the other end engages the annular flange through the ring gear either directly or through further gear coupling means.

A further feature of the invention provides a plurality of coupling means which divide the transmission load between individual coupling means.

DESCRIPTION OF THE PREFERRED EMBODIMENTS

Figure 1:
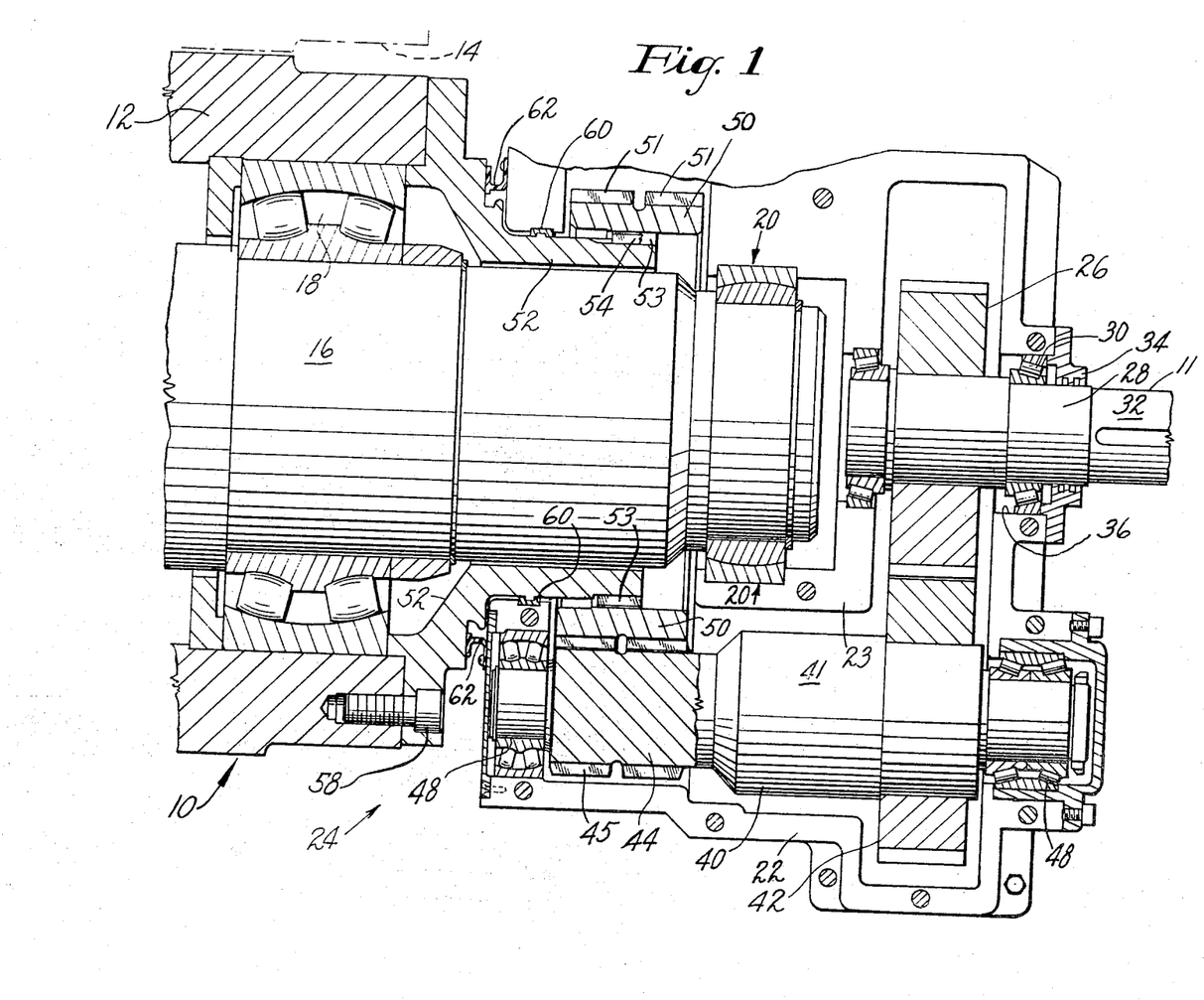
FIG. 1 is a plan view, partially in section of an embodiment of the invention.
Figure 2:
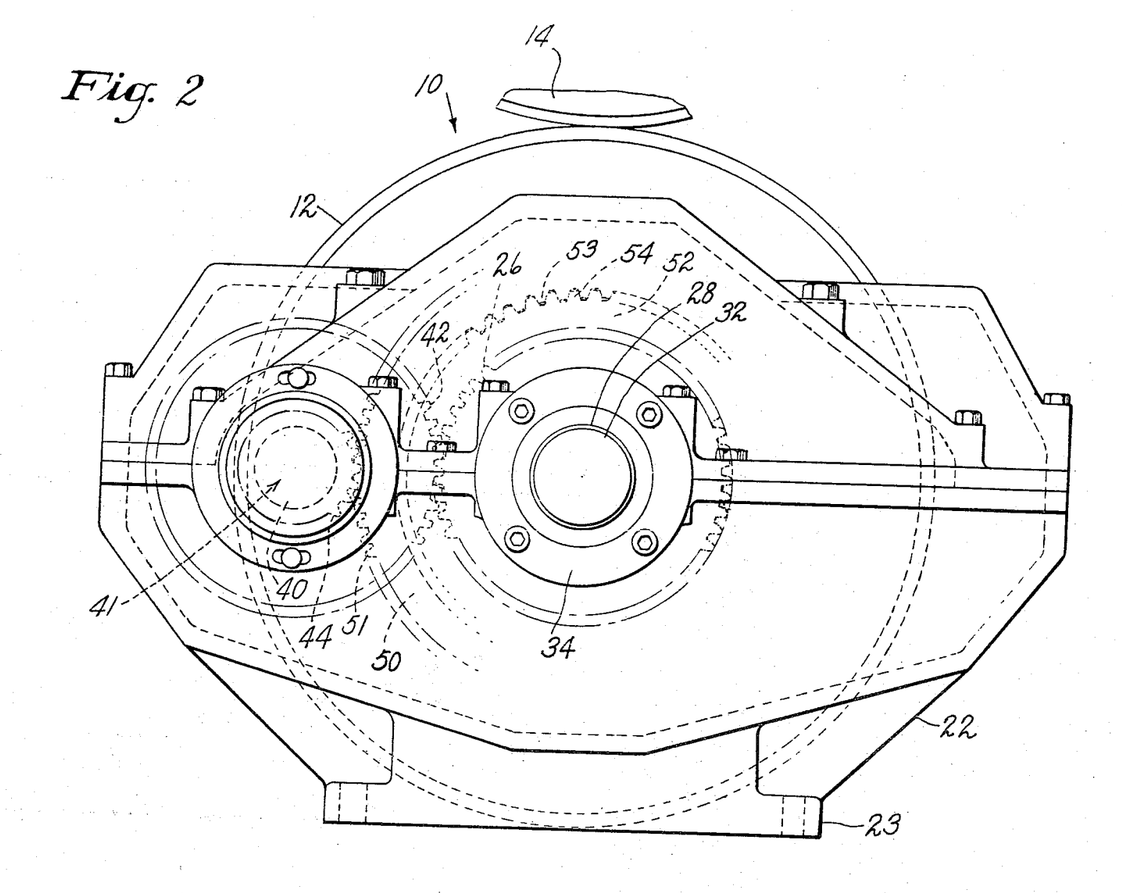
FIG. 2 is an end view, partially in section, of the apparatus illustrated in FIG. 1.
Figure 3:
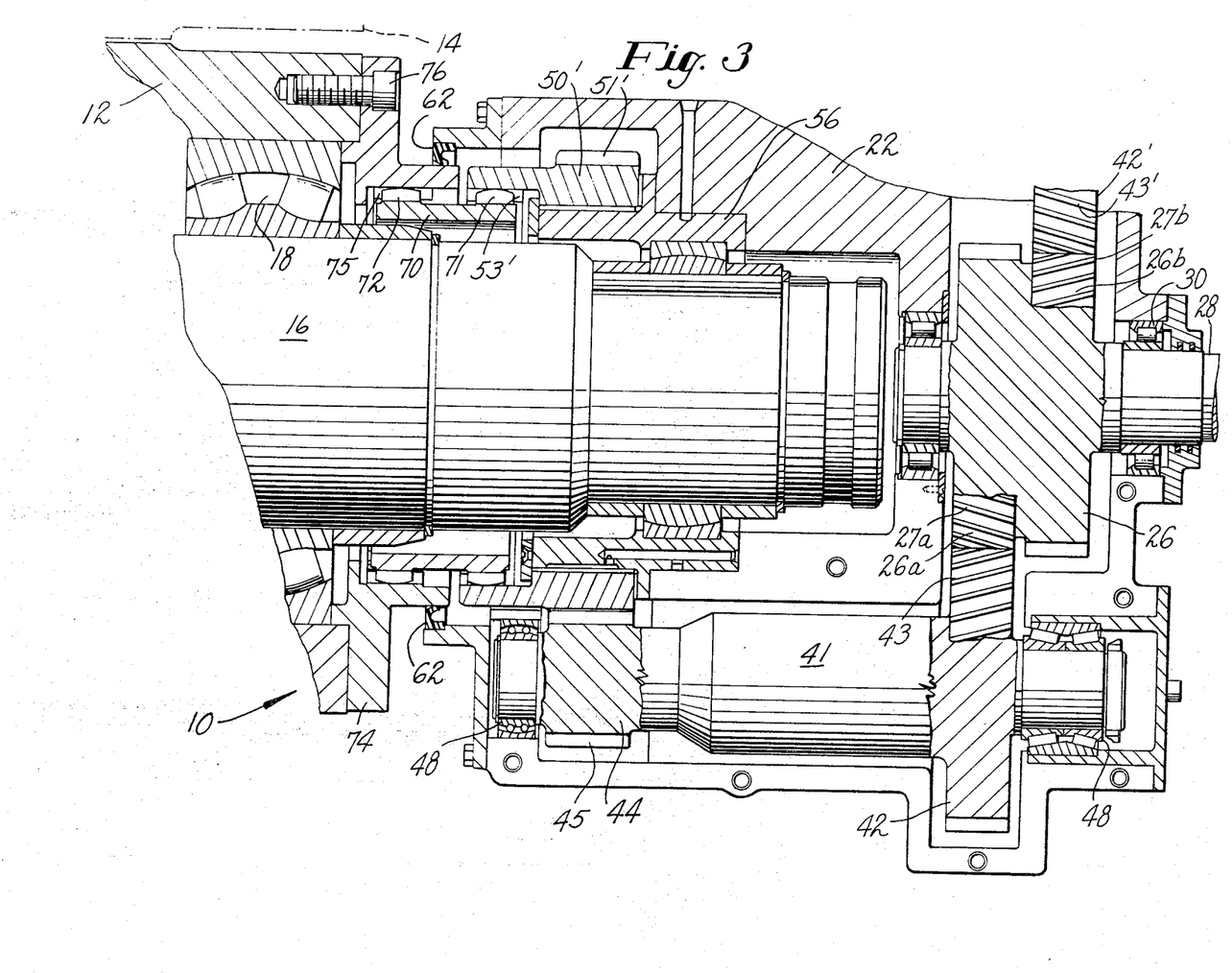
FIG. 3 is a plan view, partially in section, illustrating an alternative embodiment of the invention taken on line III—III of FIG. 4.
Figure 4:
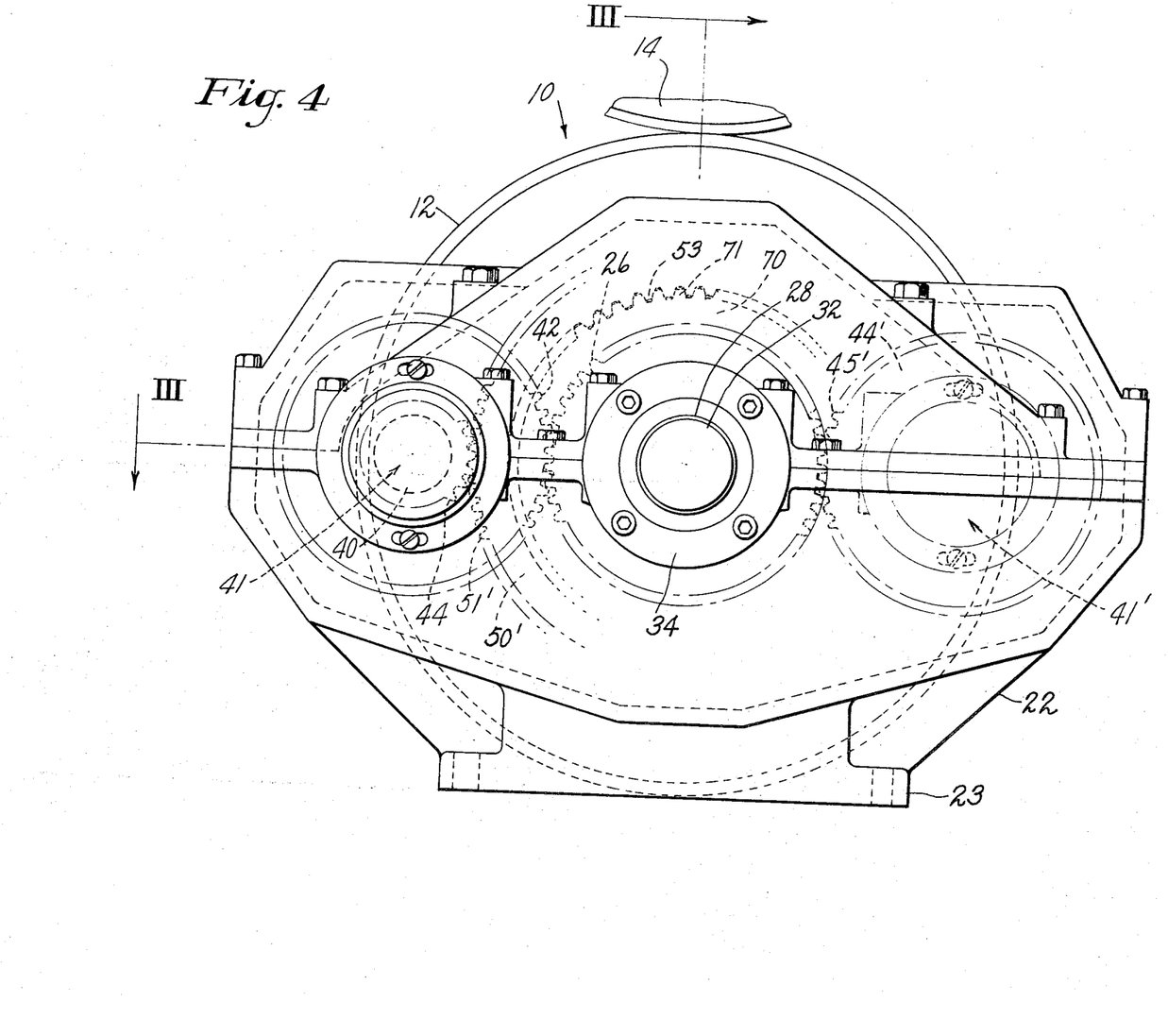
FIG. 4 is an end view, partially in section, of the apparatus illustrated in FIG. 3.
Figure 5:
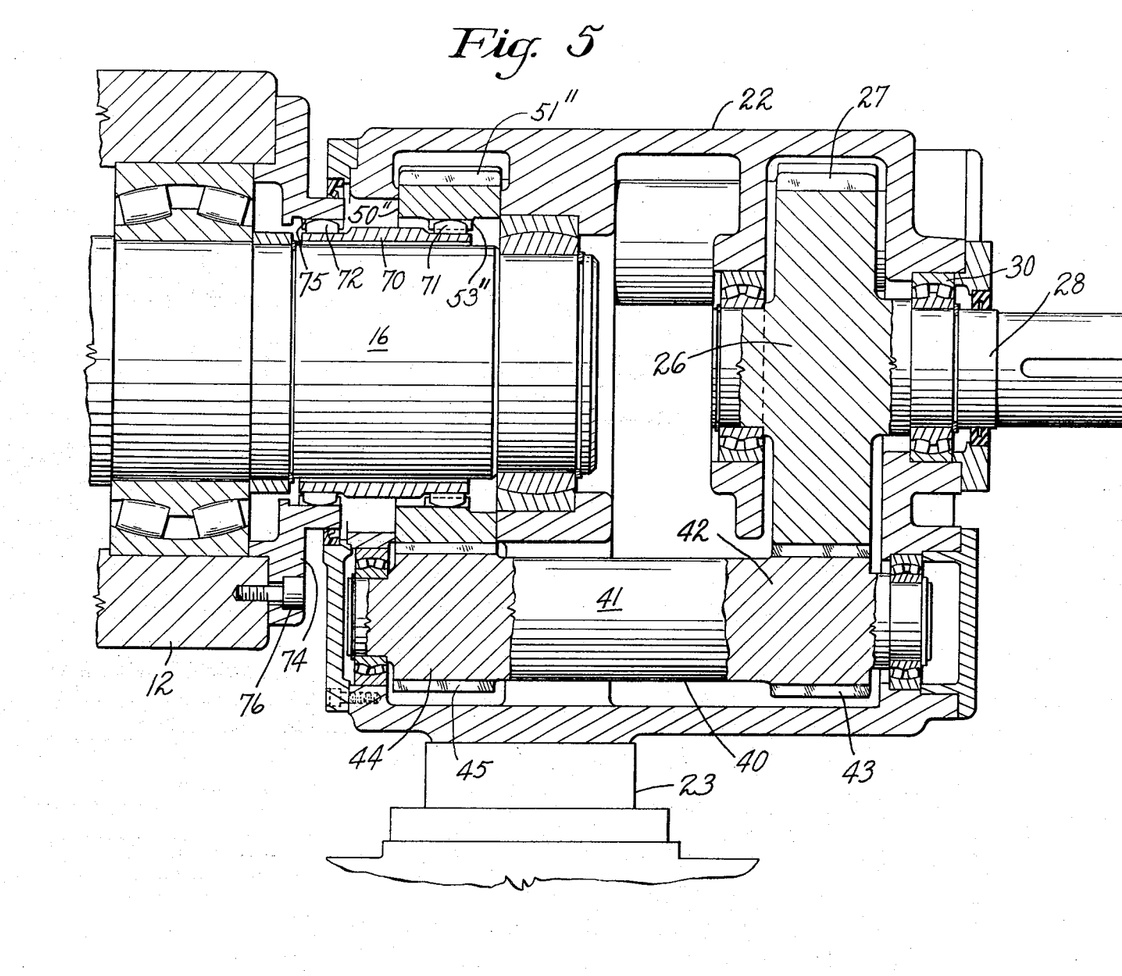
FIG. 5 is a plan view, partially in section, of another alternative embodiment of the invention taken on line V—V of FIG. 6.
Figure 6:
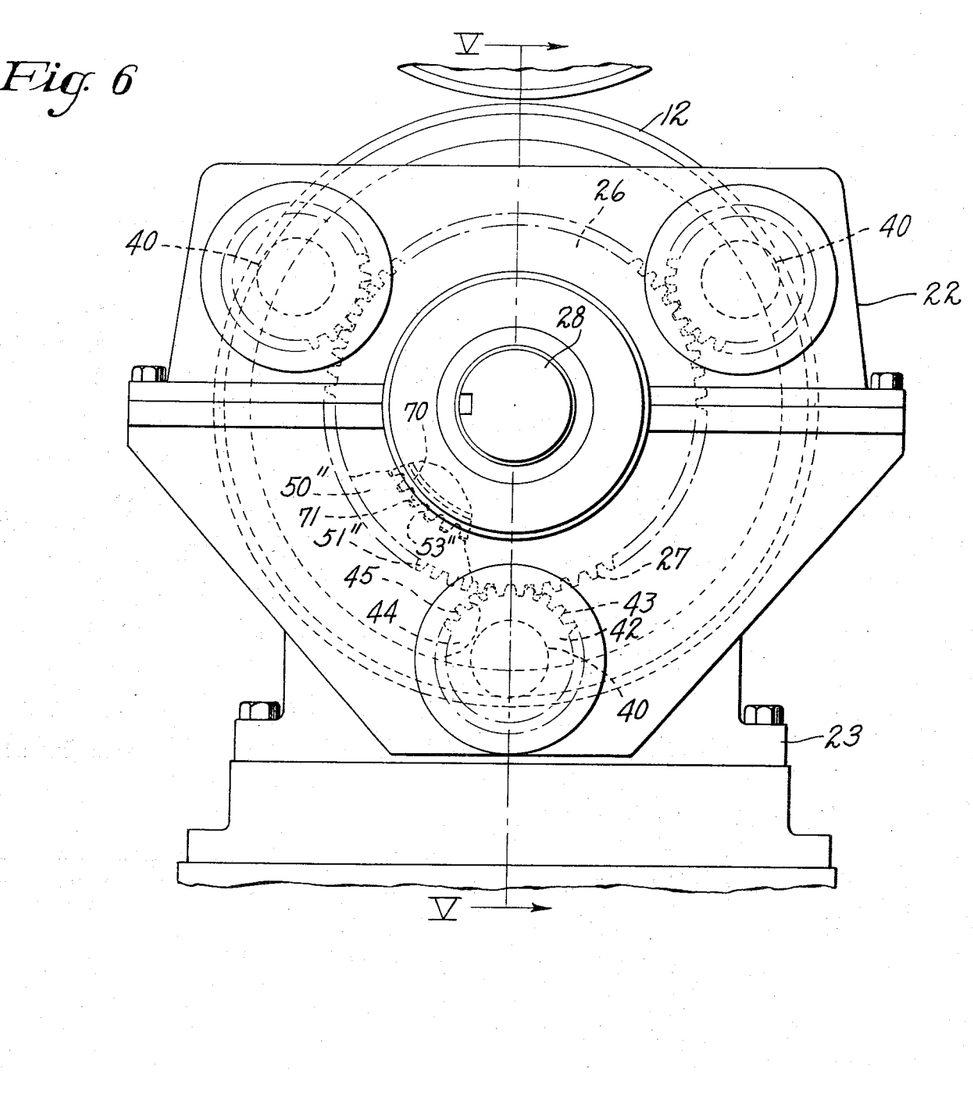
FIG. 6 is an end view, partially in section, of the apparatus illustrated in FIG. 5.

Referring generally to the Figures, three embodiments of the invention are illustrated, a single pinion-couple drive in FIGS. 1 and 2, a two-pinion-couple drive in FIGS. 3 and 4, and a multiple (three or more) pinion-couple drive in FIGS. 5 and 6. In the Figures, common parts carry identical reference numbers, and parts of similar function carry the same reference number, but primed (', ").

Referring now to the drawings and to FIGS. 1 and 2 in particular, reference numeral 10 indicates, generally, a shell roll coupled to rotary driving means 11 through apparatus embodying the invention. Included within the illustrated structure are a shell-type calender roll 12 and a cooperating roll 14 between which a uniform nip pressure may be maintained. Roll 12 is journaled on an inner, nonrotatable stationary shaft 16 by means such as rolling friction bearings 18 proximate each end of roll 12.

The stationary shaft 16 is mounted on support means at the nondriven end by means such as pedestal means, not shown, but well known in the art. Either end of the stationary shaft may be supported in bushings 20 which will accommodate the deflection movement of the shaft 16 as it bends under load. A housing 22, including pedestal support 23, generally disposed at the driven end 24 of the roll, provides structural support for bushing 20 as well as various sections of the coupling means through support 23 to a floor or other stationary mounting platform. Housing 22 may also provide means for mounting various seals necessary to insure that adequate lubrication is available to the bearings within the roll assembly 10.

As part of driving means 11, housing 22 may include a main driving gear 26 mounted on a shaft 28 journaled in bearing means 30. One end 32 may be coupled to a source of rotary motion such as a d.c. electric motor (not shown). In order to insure that proper lubrication be maintained at bearings 30, conventional sealing means 34 may be disposed about shaft 28 at housing opening 36, from which shaft end 32 protrudes. Housing 22 may also support a countershaft 40 having a pinion-couple 41 within the context of this application.

Pinion-couple 41 includes a first pinion 42 and a second pinion 44. Pinions 42 and 44 are rigidly secured upon coutershaft 40 forming the unitary couple 41 so that pinions 42 and 44 turn concurrently. In this embodiment on shaft 40 pinion 42 is a driven pinion and pinion 44 is a driving pinion. It is preferred to machine countershaft 40 and pinions 42 and 44 out of a single piece of stock such that the elements form one integral unit (e.g., the pinion-couple 41). As an alternative, individual gears may be secured upon a shaft by other means such as pinning or welding, so long as the unit formed withstands the driving load. Further, in the context of this disclosure, the use of the term "pinion" such as in reference to elements 42 and 44 should not be read as a size limitation of the relative elements. It is contemplated in the practice of the invention that "pinion 42" could be actually larger than gear 26.

Shaft 40 may be journaled in bearings 48 at either ends thereof and mounted within housing 22. Driving pinion 44 having gear teeth 45 in the embodiment illustrated in FIG. 1 engages ring gear 50. As illustrated in FIGS. 1 and 2, ring gear 50 is disposed directly upon annular flange 52. Ring gear 50 has teeth 51 about its outer perimeter. Ring gear 50 also has gear teeth 53 disposed around the inner perimeter thereof which engage gear teeth 54 of annular flange 52. Annular flange 52 extends axially of, and is fixedly secured to one end of shell roll 12, as by bolts 58. As illustrated in FIG. 1, a plurality of seals, as at 60 and 62, are disposed between those elements having relative rotary motion to insure retention of lubricants at the various bearings.

Within the scope of the term pinion-couple 41 just described, couple 41 includes individual pinions 42 and 44 as described. Consistent with this embodiment, individual pinions may be of comparable dimensions, (e.g., diameter or length) or be of different sizes (c.f. FIGS. 1 and 5). Were there advantage to such form, couple 41 might be a continuous gear form extending from pinion 42 to 44 and still be within the scope of the invention.

It should be understood that the ring gear 50 in the embodiment just described is interposed between driven pinion 44 and annular flange 52 to provide the requisite flexibility in the coupling system in order to accommodate for misalignment of the shell roll 12 and the driving gear 26 during deflection of shaft 16. Substantial vertical displacement of shell roll 12 may occur during the deflection of shaft 16 under load. Interposing the large gear ring 50 between the pinion 44 and flange 52 further enables the driving forces to be distributed over a greater number of mating gear teeth as between teeth 53 and 54 through the range of loads encountered.

As previously discussed, large amounts of mechanical energy must be supplied to roll 12 to rotate it under load. Also, under load, roll 12 may move vertically a significant amount, as a result of deflection of shaft 16, resulting in flange 52 becoming axially misaligned from its unloaded axis. The drive assembly must exhibit flexibility in some region to accommodate for the loading misalignment; however, it must still be capable of transmitting the large amount of energy between interfaces. Pinion 44, being relatively small compared to flange 53 or ring 50, must be capable of transferring the rotary load over fewer teeth than relatively similar sized gears as ring gear 50 and flange 52. By disposing pinion 44 and ring gear 50 in relatively constant relationships (radially and axially) the misalignment solution (as between teeth 53 and 54) may be concentrated away from the energy transmission problem in the minimum tooth contact area (as between teeth 51 and 45). Accommodation for misalignment is thus concentrated in the area of greater tooth contact as substantially around the periphery of flange 52 permitting these teeth 53 and 54 to individually accommodate for the misalignment. Ring gear 50 and teeth 51 may then maintain axial alignment with pinion 44 and teeth 45. Thus, the energy transferred across this interface may be spread over a large number of gear teeth, satisfying the considerations of flexibility and reliability.

The operation of the embodiment illustrated in FIG. 1 is powered by a rotary power source such as a 300 h.p. 1,200 rpm d.c. motor (not shown). The motor may be directly coupled to the shaft end 32 or through reduction gearing well known in the art. Through the motor, rotation of shaft end 32 rotates shaft 28 and gear 26 journaled in bearings 30. Rotation of gear 26 rotates driven pinion 42 mounted on shaft 40 journaled in bearings 48. Rotation of shaft 40 thus causes rotation of driving pinion 44. Rotating driving pinion 44 by engagement of gear teeth at 45 to teeth 51 rotates ring gear 50. Rotation of ring gear 50 through the engagement of teeth 53 and 54 drives flange 52 providing rotary motion to shell roll 12.

It should be noted that the couple 41 on shaft 40 driving roll 12 is separately journaled (independently of) and thus supported independently of the stationary shaft 16 through bearings 48 in housing 22. The stationary shaft 16 is supported through bushings 20 directly to housing 22 which includes the pedestal support, as at 23. By such structure the gear coupling means are not required to support the additional loading of the stationary shaft 16 as in conventional structures illustrated in the aforementioned patent. It is to be further noted that in the illustrated embodiment the shaft 16 may freely tilt in its bushing 20 without relation to, or interference of, the coupling means which provide rotary motion to shell roll 12.

As illustrated in FIG. 2, countershaft 40 and pinion-couple 41 (in the illustrated embodiment) are located laterally of driving shaft 28. It should be understood that shaft end 32 and shaft 28 are not necessarily coaxially aligned with the stationary shaft 16 and shell roll 12, either in the loaded or unloaded conditions. Likewise, the axis of couple 41 may be offset from the horizontal plane of either driving shaft 28 or stationary shaft 16.

In the embodiment illustrated in FIG. 2, couple 41 including pinions 42 and 44 is positioned laterally of driving shaft 28 and its associated driving gear 26. It should be recognized by those familiar with the art that these might be oriented in any convenient circumferential location with respect to driving gear 26. Positioning of couple 41 in the lateral or upper portion of housing 22 is preferred to free the underside of housing 22 for support of shaft 16. It should be recognized that use of a single pinion-couple 41 may be employed.

FIGS. 3 and 4 illustrate an alternative embodiment including a second couple 41' opposite that illustrated at 41 in FIG. 1 to balance the loading on gear 26 and ring gear 50.

In the two-pinion-couple embodiment illustrated in FIGS. 3 and 4, ring gear 50' is journaled in a seat 56 of a bearing material such as bronze or its equivalent. Seat 56 is disposed directly in housing 22, thus providing ring gear 50' with a fixed axial alignment with pinion-couples 41 and 41', and assuring proper alignment of teeth 45 and 51' to accomplish a satisfactory transfer of energy.

Ring gear 50' is somewhat elongated from its counterpart 50 in FIG. 1 having internal gear teeth 53' around the inner perimeter of that elongated portion. Teeth 53' engage a sleeve coupler 70 through forward external gear teeth 71. Relatively, sleeve coupler is disposed around stationary shaft 16. However, it is to be emphasized that coupler 70 is not supported by, nor normally in contact with, shaft 16.

Sleeve coupler 70 may be generally similar to the member 30 in U.S. Pat. No. 3,290,897 to Kuehn. Coupler 70 has a second set of gear teeth, on the rearward or roll side which, in turn, drivingly engage annular flange 74 through its associated gear teeth 75. Flange 74 is secured to shell roll 12 as through bolts 76.

While advantages are gained in using a plurality of couples 41, the advantages are not free of drawback. Multiple driving means without means to insure even distribution of the loading therebetween are of questionable advantage. Further, to provide adequate means for power transmission, support of the roll center shaft, and load distribution within a volume sufficiently confined to be of practical value in a rolling mill present substantial considerations to be overcome. The present invention may include load distribution means in the two-couple situation as illustrated in FIGS. 3 and 4.

As shown in FIG. 3, driving gear 26 and its shaft may be journaled to permit movement axially of shaft 28. Gear 26 may be split into two sections 26a and 26b, each having opposite but equally raked gear teeth 27a and 27b. In this embodiment, two pinion-couples 41 and 41' are illustrated, each having driven pinion 42 and 42' laterally of shaft 16 and being substantially equally spaced thereabout. Driven pinion 42 of couple 41 has gear teeth 43 complementarily raked to teeth 27a and is engaged therewith. Driven pinion 42' of couple 41' has gear teeth 43' complementarily raked to teeth 27b and is engaged therewith.

The load forces transferred through the cooperating pairs of teeth (43–27a and 43'–27b) have an axial component because of the helical tooth arrangement. If one of the couples is subjected to more load than the other, the axial component of forces tends to become unbalanced. Shaft 32 and gear 26 then may shift axially to equalize the axial load, thereby equaling the rotary load carried therebetween. In such manner, the load on ring gear 50' is equalized, and the load in each of the pinion-couples and upon bearins 48 may be kept within their operational limits. All of the foregoing contribute to the conservation of material and reliability of operation of the drive assembly.

Operation of the embodiment illustrated in FIGS. 3 and 4 is generally similar to that of the previously described embodiment. Power is supplied by means as through motor means previously described, which, in turn, rotates shaft 28 (and the associated gear 26 and teeth 27a and 27b) in bearings 30. Motion of gear 26 is thus transmitted to couples 41 and 41', rotating shafts 40 and 40', pinions 44 and 44'. By the driving engagement of teeth 45 and 51' rotary motion is supplied to ring gear 50' which, through teeth 53', engages teeth 71 of couples 70 to rotate it. Rotation is thus supplied to annular flange 74 through engaged teeth 72 and 75 to rotate shell roll 12.

As discussed in the embodiment of FIGS. 1 and 2, ring gear 50' is journaled in a relatively constant axial relationship to pinion 44, as by both being journaled in housing 22. As previously, such arrangement allows the solution to the alignment problem to be concentrated distinctly of the energy transmission problem in the gear teeth contact area. Accommodation for the misalignment is thus concentrated in the interface between the pairs of teeth 53' and 71, and of 72 and 75, thus allowing the interface between teeth 45 and 51' a stable relationship.

Referring now to FIGS. 5 and 6, another embodiment of our invention is shown and will be subsequently described. FIGS. 5 and 6 illustrate an embodiment incorporating three countershafts 40 with pinion-couples 41 disposed substantially equidistantly around driving shaft 28, the driving gear 26 and the driven ring gear 50''. In this embodiment, the bearing structure 30 supporting shaft 28 is similar to that described in the previous embodiments. Likewise, driving gear 26 is equipped with gear teeth 27 which engage driven pinions 42 and their teeth 43 as described in the previous embodiment. The pinion-couples 41 include driving pinions 44 as in the previous embodiment, each having teeth 45 disposed around the outer circumference or outer perimeter thereof. Pinions 44 are disposed on shafts 40 such that rotation of a shaft 40 rotates pinions 42 and 44 which, in turn, drive a ring gear 50''. In this embodiment ring gear 50'' is not journaled in any support bearing or bushing within housing 22. Ring gear 50'', instead, rides within the opening defined by the three driven pinions 44 and is supported by them. Ring gear 50'' in addition to external teeth 51''has a second set of gear internal teeth 53' disposed around its inner perimeter which engage a sleeve coupler 70 through forward external gear teeth 71. Sleeve coupler 70 is similar to that described in the reference to FIGS. 3 and 4.

Operation of the embodiment illustrated in FIGS. 5 and 6 is generally similar to that of the previously described embodiment. Power is supplied by means as through motor means previously described which, in turn, rotates shaft 28 (and the associated gear 26 and teeth 27) in bearings 30. Motion of gear 26 is transmitted through teeth 27 to teeth 43 of pinion 42 and rotates shafts 40. This rotary motion is transmitted through shafts 40 to pinions 44, engaged through teeth 45 and 51'' to provide rotary motion to ring gear 50'' which, through its internal set of teeth 53'', engages teeth 71 of coupler 70 to rotate coupler 70. Rotation of coupler 70 rotates similar flange 74 through mating teeth 72 and teeth 75 to rotate shell roll 12.

In this embodiment the ring gear 50 is not journaled. Instead, it is free to move in its plane of rotation under the action of forces imposed on it by the teeth 45 of the three pinion-couples 41 and will occupy a position such that the three forces are in exact equilibrium. Since the three countershafts illustrated are equidistantly disposed around the periphery of the driven ring gear 50 force equilibrium corresponds to an equal distribution of torque and power between the driving members.

As with the coupler 70 described in the patent to Kuehn (member 30 therein) teeth 71 and 75 exhibit a slightly arcuate contact surface. This tooth construction maximizes driving engagement with the respective teeth 53'' and 75 in the event of axial misalignment of coupler 70 and flange 74 of shell roll 12. This misalignment occurs under loading of shaft 16 and may result in significant displacement of shell roll 12, as disclosed in the patent to Kuehn.

It should be recognized by those skilled in the art that various other combinations of pinion-couples 41 both in number and in spacing about driving shaft 28 may be accomplished without departing from the scope of the invention. Likewise, varying coupling arrangements between driven pinions 44 and flange 74 may be accomplished with varying combinations of the means disclosed herein. Accordingly, the appended claims are intended to include all the modifications disclosed in the various embodiments described as well as other embodiments thereof which do not depart from the spirit and scope of the invention.

Having thus described our invention, what we claim as new and desire to secure by Letters Patent of the United States is:

1. A shell-type roll and means for coupling said roll to a source of rotary motion comprising: a stationary shaft; pedestal means supporting said shaft at its ends; a shell-type roll disposed over said shaft intermediate its ends; bearing means supporting said roll for rotary motion on said shaft, said means proximate either end of said roll; an annular driving flange fixedly secured to said shell roll at a driving end; drive means disposed at said end of said roll proximate said flange adapted to engage a source of rotary motion; coupling means including a countershaft journaled in said pedestal means independent of said stationary shaft and a pinion-couple disposed on said countershaft fixedly secured thereto and adapted for concurrent rotary movement therewith, said pinion-couple at one extent thereof in operative engagement with said drive means; ring gear means disposed adjacent said flange and in driving engagement therewith and also in driven engagement with the other extent of said pinion-couple, whereby said shell roll may be driven rotatably on said stationary shaft by coupling means supported independently of said stationary shaft.

2. The apparatus of claim 1 wherein said coupling means includes a geared coupling sleeve disposed intermediate said ring gear and said geared flange, said sleeve extending longitudinally about said stationary shaft and having gear teeth at the ends thereof, the teeth at one end of said sleeve in engagement with the gear teeth of said ring gear and the gear teeth at the other end of said sleeve in engagement with the gear teeth of said driving flange whereby flexibility of the coupling means is enhanced during misalignment of said coupling means introduced by deflection of said stationary shaft.

3. The apparatus of claim 2 wherein the gear teeth of said coupling sleeve include curved contact surfaces whereby driving connection between said cooperating gear teeth is promoted during misalignment of said coupling means.

4. The apparatus of claim 2 wherein said ring gear is journaled in bearing means supported within said pedestal means.

5. The apparatus of claim 4 wherein said coupling means includes at least two pinion-couples generally equidistantly spaced about the circumference of said ring gear such that the driving forces applied to said ring gear are substantially balanced between said couples.

6. The apparatus of claim 5 wherein said means includes two countershafts and means to equalize the driving load between said countershafts comprising said driving means including side-by-side contrapitched helical gearing, said pinion-couples adapted at one end with complementing helical gearing, each to engage one of said contrapitched helical gears of said driving means and at least one of said driving means and pinion-couples journaled for axial movement whereby said driving means or said pinion-couples may move endwise to equalize the driving load between said pinion-couple.

7. The apparatus of claim 2 wherein said coupling means includes at least three countershafts and pinion-couples in engagement with said drive means and generally disposed around said ring gear such that said ring gear is driven by and is supported within said pinion-couples.

8. The apparatus of claim 7 wherein said countershafts and pinion-couples are substantially equidistantly spaced around the circumference of said ring gear such that the driving forces applied to said ring gear are substantially balanced.

* * * * *